Figure 4:
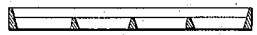

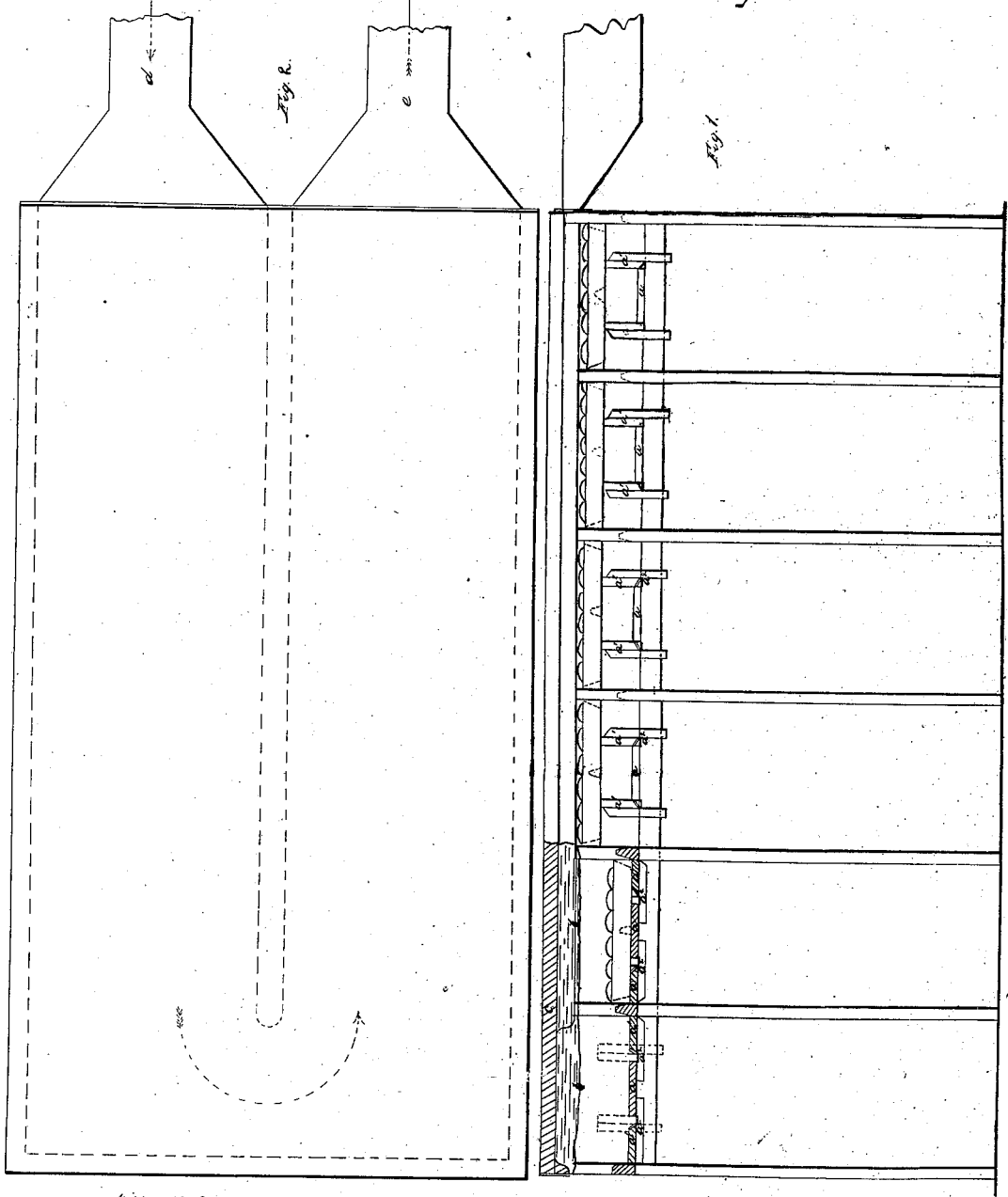

Sheet 2-3 Sheet
W. J. Cantelo,
Incubator,
Nº 5,204.   Patented July 24, 1847.
Upper Side.
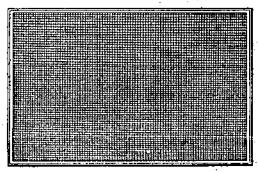
Section.
Under Side.
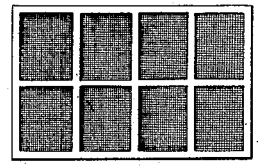
Fig. 3.
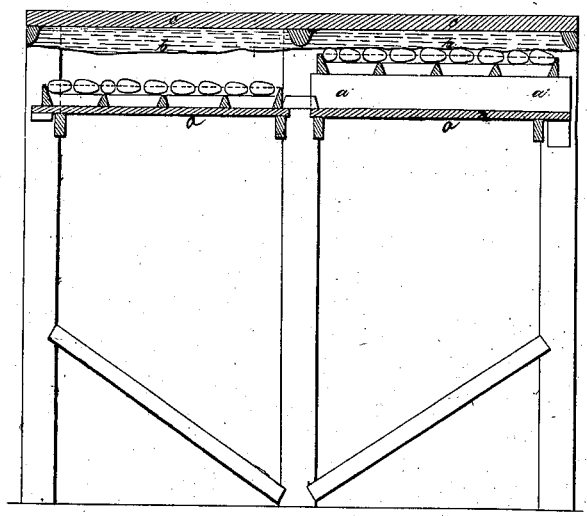
Witnesses:   Inventor:

W. J. Cantelo,

Incubator,

Nº 5,204.

Patented July 24, 1847.

Witnesses

Inventor:
W. J. Cantelo

UNITED STATES PATENT OFFICE.

WM. JAMES CANTELO, OF NORTH LAMBETH, ENGLAND.

ARTIFICIAL INCUBATION.

Specification of Letters Patent No. 5,204, dated July 24, 1847.

*To all whom it may concern:*

Be it known that I, WILLIAM JAMES CANTELO, a citizen of the United States of America, now residing in Paris street, North Lambeth, in the county of Surrey, in the Kingdom of England, have invented or discovered new and useful Improvements in Apparatus for Hatching Eggs and Raising the Young; and I, the said WILLIAM JAMES CANTELO, do hereby declare that the nature of my said invention and the manner in which the same is to be performed are fully described and ascertained in and by the following statement thereof, reference being had to the drawings hereunto annexed and to the figures and letters marked thereon, that is to say:

Heretofore in arranging apparatus for hatching of eggs by artificial incubation it has been usual so to construct the same that the eggs are placed in a heated atmosphere of a temperature which is thought the best for the purpose, so that the whole surface of each egg has heretofore been subjected to the same temperature which I have discovered after numerous experiments is highly injurious and only a very low percentage of the eggs submitted to artificial incubation can by such means be hatched and I attribute that result to the evaporation of too much of the fluid of the egg. It will be found and it is a well known fact that the germ of the egg floats at the upper part of the egg and the bird in natural incubation applies the direct heat of the body to that part of the egg and the lower part of the egg is comparatively at a much lower temperature than the upper part where the germ is. In addition to which the bird often leaves the nest for a time by which each egg is more or less ventilated.

Now the object of the first part of the invention is so to arrange apparatus for artificial incubation that the heat may be contact heat from above while the lower surfaces of the eggs are kept comparatively at a low temperature and by such means to imitate nature as nearly as may be. I would remark that the arrangement of apparatus for obtaining the requisite heat from above to eggs for carrying on the process of artificial incubation according to my invention may be varied and therefore although I shall hereafter describe an arrangement of apparatus such as I have found fully to answer and is what I believe to be the best for the purpose, I do not confine myself thereto so long as the peculiar mode of carrying on the process of artificial incubation by top contact heat be retained.

The second part of my invention relates to the arrangement of apparatus to serve the purpose of the mother in imparting warmth to the young bird and consists of circulating heated fluids through flexible pipes so that the young birds can pass under and press themselves against such heated flexible pipes or surfaces and such an apparatus will be found to offer a like mode of applying warmth to the young to that which is offered by the mother and the young having a yielding warm surface above against whom they can press themselves they will not be found to huddle together as has heretofore been very commonly the case in bringing up young birds and such huddling together renders the young very weakly and tender and very few are raised to maturity, but in order that the invention may be more fully understood I will proceed to describe the drawings hereunto annexed.

*Description of the drawings.*—Figure 1 shows a longitudinal elevation of an apparatus partly in section for carrying on the process of artificial incubation according to my invention. Fig. 2 is a plan of the top surface thereof. Fig. 3 is a transverse section thereof and Fig. 4 shows an upper and under and a sectional view of one of the trays used for receiving the eggs.

These trays have wire cloth or open surface at the bottom so that air may pass freely to the eggs placed therein. The trays are placed on the shelves $a$ $a^1$ as shown the parts $a^1$ of the shelves being hinged at $a^2$ $a^2$ to the fixed parts $a$ so that the parts $a^1$ may be either in a horizontal or a vertical position. When they are in a vertical position the trays thereon are raised to the highest position and the eggs thereon come in contact with the flexible surface $b$ above and it is by this means that heat is applied to the upper surface of each egg—$c$ is the top or cover of the apparatus.

Between the cover $c$ and the flexible waterproof fabric water of about 108° Fahrenheit is caused to circulate care should however be observed that the water is not so hot as to cause the surface in contact with the eggs to be more than about 104° of Fahrenheit and although such circulation may be accomplished by the simple act of heating the cistern or vessel with which the space between $c$ and $b$ communicates by two pipes $d$ $e$ yet I prefer to use a pump or a wheel constantly propelling the water through the pipe $d$ by which a more uniform temperature will be maintained to all the surface $b$ acting on the eggs below as it is important to the process of artificial incubation that the heat should be kept to each egg about 102° to 104° of Fahrenheit and this mode of aiding the circulation of heated water will be found desirable and useful whenever a more uniform heat is desired than can be obtained by the natural circulation resulting from heating water at one part of the apparatus.

The pipes $d$ and $e$ communicate with a cistern or vessel in which the water is kept slightly above that which it is desired should pervade the surface $b$ and although various means of heating the water may be resorted to I prefer to use the boiler hereafter described. From the above description it will be seen that the process is carried on according to my invention more nearly resembles the act performed by the bird than when the egg is placed in an atmosphere of heat for by my invention the heat applied is top contact heat while the lower part of the egg is comparatively out of the influence of the heat and is ventilated below. The eggs should be lowered from contact with the heated surface from time to time. I have found that this should be done every day after the first two and I leave them down for thirty minutes and I from time to time examine the eggs by allowing light to pass through them by placing them before a hole in a shutter after the first two days if there is a germ it will readily be seen if not the egg should be rejected. Toward the end of the process room should be given between the eggs endwise to give room for the young as they leave the eggshell.

The apparatus should be in a well ventilated room kept to a temperature of from 60° to 70° of Fahrenheit.

Figure 5:
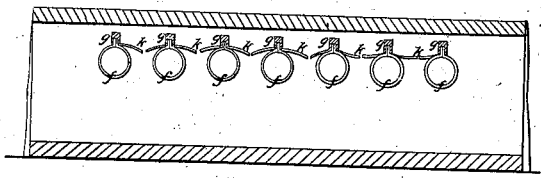
Figure 6:
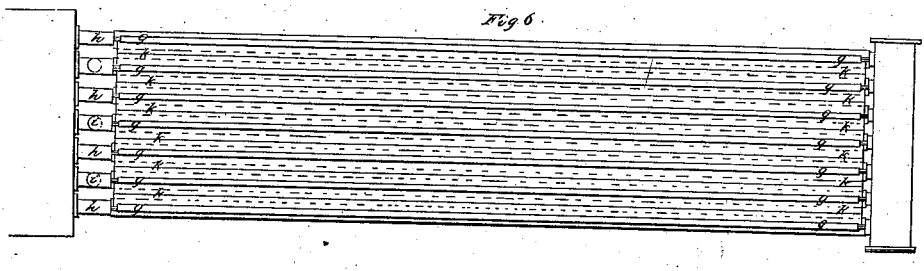
Figure 7:
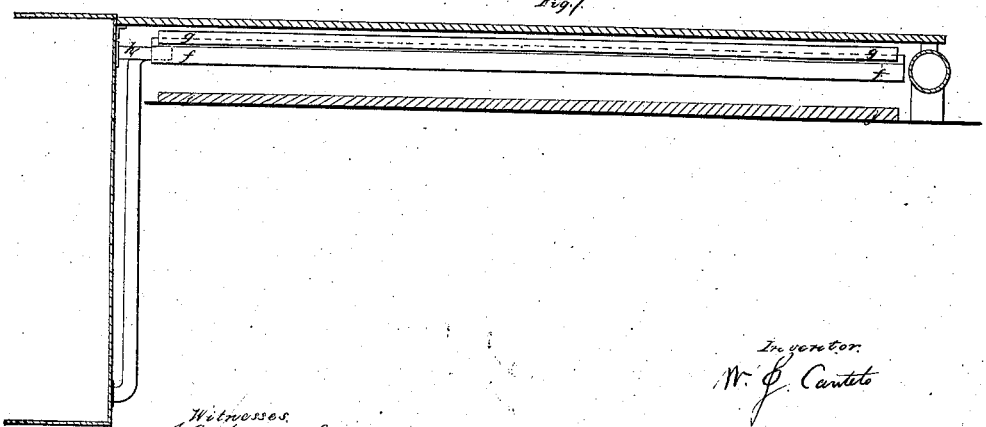

I will now describe the second part of my invention. Fig. 5 shows a transverse section. Fig. 6 is a plan and Fig. 7 a longitudinal section of apparatus constituting the artificial mother for the young birds to nestle under. It consists of a series of flexible pipes $f$ $f$ made of waterproof fabric suspended on bars $g, g$ these flexible pipes communicate by pipes $h$ and $i$ with a cistern of water kept at a temperatue of 110° Fahenheit so that the water flows through one pipe $f$ from the cistern and back through the other into the cistern. $j$ is a board or platform on which the chickens or young birds stand and which from time to time can be drawn out to be cleansed when the young birds are away. $k$ $k$ are strips of woolen cloth running from end to end of the pipes. This apparatus will be found highly useful in bringing up chickens or other young birds.

Having thus described the nature of the invention and the manner of performing the same I would have it understood that I do not confine myself to the precise details so long as the peculiar character of the invention be retained. But

1. But what I claim is the so constructing apparatus for hatching eggs that the heat given to them may be contact heat from above while the lower surfaces of the eggs are kept comparatively at a lower temperature.

2. And I claim the arranging flexible pipes $f$ $f$ for imparting warmth to the young bird as herein described.

W. J. CANTELO.

Witnesses:
JOSEPH MARQUETTE,
WILLIAM EWING.